W. JACOBSON.
TIRE PROTECTOR.
APPLICATION FILED AUG. 15, 1913.
1,089,222.
Patented Mar. 3, 1914.
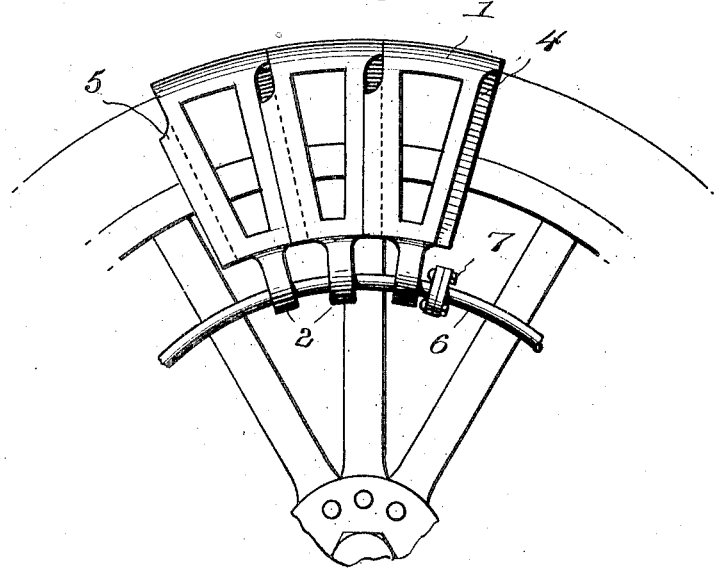
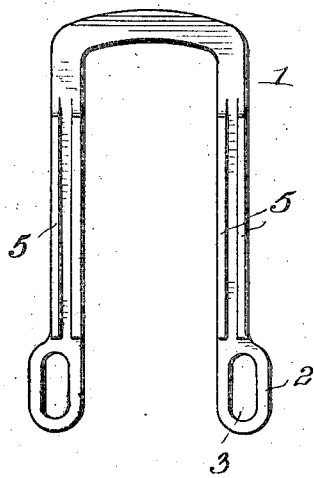
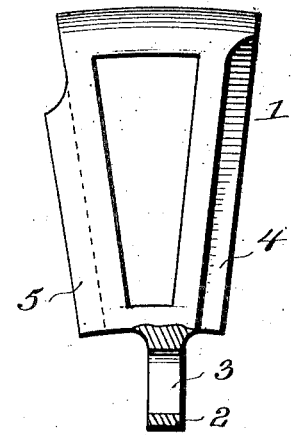
Witnesses
William Smith.
K. Peacock
Inventor
W. Jacobson.
By Victor J. Evans
Attorney

UNITED STATES PATENT OFFICE.

WILHELM JACOBSON, OF LENTS, OREGON.

TIRE-PROTECTOR.

1,089,222. Specification of Letters Patent. Patented Mar. 3, 1914.

Application filed August 15, 1913. Serial No. 784,997.

*To all whom it may concern:*

Be it known that I, WILHELM JACOBSON, a citizen of the United States, residing at Lents, in the county of Multnomah and State of Oregon, have invented new and useful Improvements in Tire-Protectors, of which the following is a specification.

This invention relates to tire protectors and it consists in the novel features hereinafter described and claimed.

An object of the invention is to provide a protector of the character indicated which is composed of a series of U-shaped members adapted to interengage each other and adapted to be applied about a tire together with means for holding the said members in position upon the tire and wheel. The members are mounted for limited movement with relation to each other whereby the resiliency of the tire is not affected by the presence of the protecting members.

In the accompanying drawing: Figure 1 is a side elevation of a portion of a wheel and tire showing the protector applied thereto. Fig. 2 is an edge elevation of one of the members of the protector. Fig. 3 is a side elevation of the same.

The tire protector comprises members 1 which are U-shaped in edge elevation and which are approximately sector shape in side elevation. Inasmuch as these members are all alike a description of one will answer. Each member is provided at its end with lugs 2 which in turn are provided with elongated openings 3 which are disposed with their long dimensions parallel with the sides of the member 1. The side portions of the member 1 at one edge are reduced transversely as at 4 and the said side portions of the member are provided at their opposite edges with spaced flanges 5. The flanges 5 of one member are adapted to receive between them the reduced portion 4 of the next adjacent member and so on throughout the series of members.

The members are assembled edge to edge around the tire of the wheel and the members 1 may move longitudinally with relation to each other and radially with relation to the wheel. The interengaging flanges 5 and reduced portions 4 of the said members restrain the members against relative lateral movement with respect to each other.

When the members are assembled about the tire of a wheel as above indicated rod sections 6 are passed through the openings 3 and the ends of the sections 6 are connected together by means of traction bolts 7 or other suitable traction means whereby the said sections may be drawn toward each other.

When the protector is applied about a tire upon a wheel as illustrated in Fig. 1 of the drawings the rod sections 6 normally have contact with the inner ends of the openings 3 and the intermediate portions of the members 1 are held in close contact with the periphery of the tire. When the wheel is passing over the ground the intermediate portions of the members 1 have contact with the ground and thus protect the tire. As the members 1 strike obstructions or uneven places the tire may give and the said members 1 may move longitudinally or radially with relation to the wheel and thus the resiliency of the tire is preserved notwithstanding the presence of the protecting members 1 upon the same.

Having described the invention what is claimed is:—

A tire protector comprising members U-shaped in edge elevation and sector shaped in side elevation, said members having their side portions at one edge reduced transversely and provided at the opposite edge with spaced flanges, the flanges of one member adapted to receive between them the reduced portion of an adjacent member, said members having at their ends lugs provided with elongated openings, rod sections passing through the openings and means for drawing the rod sections together.

In testimony whereof I affix my signature in presence of two witnesses.

WILHELM JACOBSON.

Witnesses:
C. E. KENNEDY,
N. GISLING.